US008035323B2

(12) United States Patent
Cruise et al.

(10) Patent No.: US 8,035,323 B2
(45) Date of Patent: Oct. 11, 2011

(54) CONTROL OF A LINEAR MOTOR

(75) Inventors: Rupert John Cruise, London (GB); Christopher Roger Lines, Gauteng Province (ZA)

(73) Assignee: Texchange Limited, London (GB)

( * ) Notice: Subject to any disclaimer, the term of this patent is extended or adjusted under 35 U.S.C. 154(b) by 548 days.

(21) Appl. No.: 11/989,928

(22) PCT Filed: Aug. 3, 2006

(86) PCT No.: PCT/IB2006/002126
§ 371 (c)(1),
(2), (4) Date: Feb. 4, 2008

(87) PCT Pub. No.: WO2007/017723
PCT Pub. Date: Feb. 15, 2007

(65) Prior Publication Data
US 2010/0097014 A1  Apr. 22, 2010

(30) Foreign Application Priority Data
Aug. 5, 2005  (ZA) ................................ 2005/06298

(51) Int. Cl.
*H02P 7/00* (2006.01)
(52) U.S. Cl. ................ 318/135; 318/400.34; 310/12.01; 310/12.18
(58) Field of Classification Search .................. 318/135, 318/400.34; 310/12.01, 12.18
See application file for complete search history.

(56) References Cited

U.S. PATENT DOCUMENTS

| 4,853,602 | A | * | 8/1989 | Hommes et al. | 318/38 |
| 4,893,071 | A | * | 1/1990 | Miller | 324/660 |
| 6,175,169 | B1 | * | 1/2001 | Hollis et al. | 310/12.05 |
| 6,281,644 | B1 | * | 8/2001 | Komatsu et al. | 318/38 |
| 6,952,086 | B1 | * | 10/2005 | Krefta et al. | 318/135 |
| 6,965,176 | B2 | * | 11/2005 | Hsiao | 310/12.17 |
| 7,233,119 | B2 | * | 6/2007 | Sieber et al. | 318/135 |
| 2002/0060546 | A1 | | 5/2002 | Veltman | |
| 2002/0180395 | A1 | | 12/2002 | Binnard | |

FOREIGN PATENT DOCUMENTS

EP    0 746 090 A2    12/1996
* cited by examiner

*Primary Examiner* — Walter Benson
*Assistant Examiner* — David Luo
(74) *Attorney, Agent, or Firm* — The Nath Law Group; Jerald L. Meyer; Sung Yeop Chung

(57) ABSTRACT

Disclosed is a linear electric motor having a fixed primary comprising a stator divided into a number of sections, including a translating secondary having an operative length longer than any two adjacent sections of the stator in the form of a reaction plate, and a connecting means for connecting only those sections of the stator that are at least partially covered by the reaction plate. The position of the reaction plate relative to the stator is determined by monitoring current in the active representative sections. Power is supplied to each stator section individually, with power supplied in a modulated manner to end active stator sections only partially covered by the reaction plate. A measurement of the current to the active representative section is used to control output voltage to all energized stator sections and is used to determine the change in position of the reaction plate.

24 Claims, 1 Drawing Sheet

CONTROL OF A LINEAR MOTOR

THIS INVENTION relates to an electric linear motor and the control thereof.

In accordance with the invention there is provided an linear motor which includes a fixed primary that is divided into a number of sections;

a translating secondary that has an operative length that is longer than any two adjacent sections of the stator; and a connecting means for connecting only those sections of the primary that are in the vicinity of the secondary to a power supply.

Further in accordance with the invention there is provided a method of controlling a linear motor having a fixed primary that is divided into a number of sections and has a translating secondary that has an operative length that is longer than any two adjacent sections of the primary, which includes determining which of the primary sections are in the vicinity of the secondary; and energising only those sections that are in the vicinity of the secondary.

Still further in accordance with the invention there is provided a control arrangement for a linear motor having a fixed primary that is divided into a number of sections and a translating secondary that has an operative length that is longer than any two adjacent sections of the primary; which includes a connecting means for connecting only those sections of the primary that are in the vicinity of the secondary to a power supply.

In particular, those sections of the primary that are covered by the secondary may be connected to the power supply.

The term "covered", in relation to a particular section of the primary, is to be understood to mean that the secondary is aligned with that section; and "covers" will have a comparable meaning. Further, a section will be "fully covered" if the secondary extends beyond the ends thereof and will be "partially covered" if the secondary overlies only a part thereof.

It will be appreciated that the primary sections need not be physically divided separate sections. The segmentation merely needs to be in terms of electrical supply to the windings.

The primary may comprise a stator and the secondary a reaction plate. The operative portion of the reaction plate will then be used to determine if a stator section is covered, either fully or partially.

Each stator section may be connectable independently to the power supply.

For ease of convenience, those stator sections that interact with the reaction plate are referred to hereinafter as "active" sections.

The connecting means may include a number of switches, there being a switch for each stator section, and a control means for controlling opening and closing of the switches. For a multi-phase stator winding, each "switch" may comprise several switches in order to connect/disconnect all of the phases of each stator section to/from the power supply.

Those stator sections that are fully covered may be, in use, energised. It will be appreciated that, as the reaction plate moves relatively to the stator sections, that there will, at times, be end stator sections that are only partially covered by the reaction plate, the degree of cover decreasing at one end and increasing at the other end, in the direction of travel of the reaction plate. Should these partially covered stator sections be considered active and hence energised, it is desirable that the magnitude of the current flowing in these outer stator sections is comparable to that flowing in the other active stator sections, such that the force produced per unit length of the active stator sections is approximately constant. However, the inductance of, as well as the back EMF produced in, the partially covered end stator sections varies with coverage and is lower than that of the fully covered stator sections. Thus, if these partially covered sections are treated as fully covered active sections and are merely connected in parallel to the voltage supply, the resulting currents would be too high. The invention may then include modulating the voltage supply to these partially covered stator sections by using the switch connecting the stator section to the power supply to switch the stator section on and off the supply with a duty cycle related to the degree of coverage of the stator section. The control means may thus include a modulating means.

The current flow through the stator sections may be used to determine the position of the reaction plate and which of the stator sections are, in operation, active. A filtering means may be provided to filter out transients in current flow measurement. Alternatively, or in addition, the inductance of the stator sections may be used to determine which of the stator sections are active, and thus the position of the reaction plate, since the inductance of each stator section is related to the degree of its coverage by the reaction plate. Thus, the control means may include an inductance measuring means for measuring the inductance of a selected set of stator sections. The selected set may be a single section or a plurality of sections. On start-up, an initial position reference point may be established by means of a binary or other search procedure. For a binary search, the combined inductance of all of the stator sections comprising one half of the total length of stator can be measured, followed by measuring the inductance of the other half of the total length of stator. It can hence be determined that the reaction plate is within the half having an inductance that has been influenced by the higher inductances of the active stator sections. This process is repeated recursively (halving the number of stator sections used for the search at each iteration) until the reaction plate position is known to within a pole pair. One approach to measuring inductance is to measure the time taken for current to decay within the windings after briefly energising them. The winding inductance is proportional to the time constant of the decay (for a constant resistance). Such excitation may be such that significant force transients do not result in the motor. It will be appreciated that the resistance of the stator windings will depend on the temperature thereof. Thus, a temperature determining means may be provided for determining the temperature of at least one stator section.

The stator sections may all have the same length. Thus the length of the stator sections is at most a half that of the reaction plate. It will be appreciated that control of the motor will depend on the size of the stator sections compared to the operative length of the reaction plate. The optimum stator section length will vary depending on a number of trade-offs. For example, the shorter the length of each stator section, the greater the number of stator section switches required, yet the shorter the length of inactive reaction plate.

The stator sections may be categorised into two or more groups. In one embodiment they may be categorised into three groups, being first and second groups of "representative" stator sections and a third group of "ordinary" stator sections. The first and second representative stator sections may alternate, such that there is a sequence of first, second, first, second, etc representative stator sections, with ordinary stator sections between them. The representative groups may comprise individual stator sections. There may be one or more ordinary stator section between each first and second representative stator section. The number of ordinary stator sections between a first representative stator section and the next second representative stator section may be the same as that between a second representative stator section and the next first representative stator section. Thus the distance between the start of a first representative stator section and the end of the next second representative stator section, including the ordinary stator sections between, may be the same as that between a second representative stator section and the end of the next first representative stator section. The current flowing into a representative stator section may be used to infer information regarding the entire interaction of the reaction plate with the stator. Hence, at any particular point in time, the current flowing in a single active representative stator section can be used by a controller to output an appropriate switching pattern for the inverter supplying all of the active stator sections. Further, if an independent measurement of the reaction plate's position relative to the stator is not being used (i.e. sensorless control), the position can be inferred from the position determined to within a pole-pair at start-up and an ongoing estimate of the electrical angle between the reaction plate flux and the in use representative stator section winding, as calculated by the controller.

Further, several reaction plates and several stators may be mounted alongside each other that are mechanically and electrically coupled so as to act as a single linear motor.

The invention is now described, by way of an example, with reference to the accompanying diagrammatic drawing, which shows a linear motor in accordance with the invention.

Figure 1:
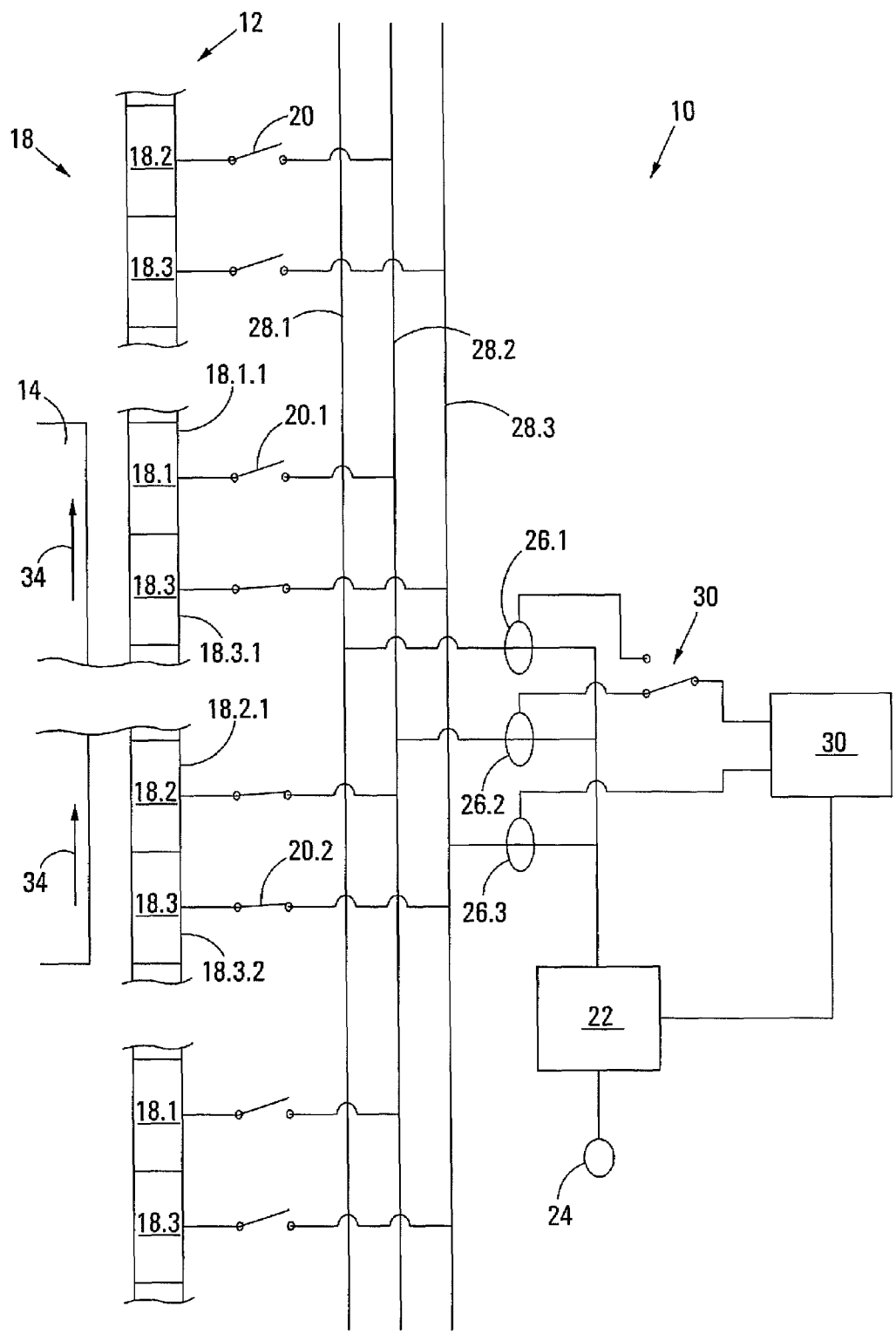
FIG. 1 shows a configuration of a linear electric motor in accordance with the claimed subject matter.

With reference to the drawings, a linear electric motor in accordance with the invention is designated generally by reference numeral 10. The motor 10 has a fixed stator 12 and a translating reaction plate 14. The motor 10 further has a control arrangement.

The stator 12 is segmented into constant length sections 18 along the length of travel of the reaction plate 14, where each section 18 can be separately fed from an electrical power source. This segmentation may be achieved by creating physically separate stator modules or could merely entail the provision of connections to sections of the stator winding.

The stator sections 18 are categorised into three groups 18.1, 18.2 and 18.3 along the length of travel of the reaction plate 14. The group 18.1 is a first group of representative stator sections; the group 18.2 is a second group of representative stator sections; and the group 18.3 is a group of ordinary sections. A suitable number of ordinary stator sections 18.3 are provided between each first representative section 18.1 and the next adjacent second representative section 18.2 and between each second representative section 18.2 and the next adjacent first representative section 18.1. It is to be noted that there are no physical differences between the different groups of stator sections. Each stator section 18.1, 18.2 and 18.3 has a corresponding electronically controlled switch 20 that connects it to the output of an inverter 22, which is supplied from a suitable power source via terminal 24. If the linear motor 10 is a multi-phase machine, each switch 20 represents multiple switches that operate concurrently (or with a slight delay to allow for zero-crossing switching). Furthermore, there may be switches (not shown in the drawing) that act to short the stator windings (possibly through a braking resistor) when there is a power failure to enable dynamic braking. The switches 20 may be electromechanical relays or electronic switches that use silicon controlled rectifiers (SCRs), insulated gate bipolar transistors (IGBTs) or any other electronic switching technology.

As seen in the drawing, the reaction plate 14 has a length that is equal to the distance from the beginning of a first representative stator section 18.1 to the end of the ordinary stator section 18.3 immediately following the next second representative stator section. 18.2. Thus, as seen in the drawing, with the reaction plate 14 being positioned relative to the stator 12 as shown, the stator sections 18.2.1, 18.3.1 and 18.1.1 are fully covered by the reaction plate 14. The stator section 18.3.2 (ie the ordinary stator section immediately preceding the stator section 18.2.1) is also fully covered. With the basic control strategy of the invention, only these stator sections that are fully covered by the reaction plate 14 are switched on to the output of the inverter 22. It will be understood that those sections of the stator that are fully covered by the reaction plate are those stator sections that are able to fully interact with the reaction plate 14.

Three sets of current sensors 26.1, 26.2 and 26.3 are used, as shown in the drawing, to measure the current flowing into each of the three groups of active stator sections, which are fed off different supply cables 28.1, 28.2 and 28.3. A controller 30, sets the switching state of the inverter 22 and controls operation of the switches 20, in accordance with the relative position of the reaction plate 34 as determined by a position determining module 38 incorporated in the controller 30. The controller 30 makes use of the measurement of current flowing into either the first representative stator section 18.1 or the current flowing into the second representative stator section 18.2 to determine the position of the reaction plate 34. Signals provided by the sensors 26 are supplied to a current measuring module 40 after being filtered by a filter 42 to remove transients. The current values provided by the current measuring module are supplied to the position determining module 38. Note that the functionality represented by controller 30 may be implemented as part of a distributed or hierarchical control system. The multiplexing between the measurements of current flowing into the representative stator sections 18.1 or 18.2, illustrated by switch 32, may be performed either in hardware or software. The measurement of current flowing into the ordinary stator sections 18.3 may be used for the detection of fault conditions or for determining the initial position of the reaction plate 14, as described below. The magnitude of the output voltage of the inverter 22 is common to all active stator sections and a measurement of this voltage may also be utilised by the controller 30. Since both active representative stator sections 18.1 and 18.2 are fully covered by the reaction plate 14, they are electrically indistinguishable from stators of rotary machines. This is significant in that a control technique originally designed for rotary machines and which may use a measurement of stator current can be used to control the linear motor with the described stator switching strategy. Furthermore, measurements of the temperature of the active stator sections or an average temperature measured over several stator sections may be used by the controller 30 to compensate for variation in each stator section's winding resistance. A temperature sensor 46 and temperature measuring module 48 are indicated.

A description of the typical sequence of events that must occur as the reaction plate 14 moves up the stator 12, in the direction indicated by arrows 34, from the position shown in the drawing, is as follow. Once the reaction plate 14 fully covers the first representative stator section 18.1.1, this stator section is connected to the output of the inverter by closing switch 20.1. At the same time, ordinary stator section 18.3.2 is disconnected from the supply by opening switch 20.2, as it is about to no longer be fully covered by the reaction plate 14. At this point, the current flowing into the second representative stator section 18.2.1 is used to perform control of the motor. It is only once the transients in the current flowing into the newly switched-in first representative stator section 18.1.1 have died down sufficiently that the multiplexer 32 selects the current flowing into the first representative stator section 18.1.1 as the control variable. However, this transition must take place whilst second representative stator section 18.2.1 is still fully covered by the reaction plate 14. Thus, at the time of the changeover, the currents flowing into the two fully covered representative stator sections 18.1.1 and 18.2.1 are similar enough for the controller not to detect a significant disturbance. Furthermore, filtering of the measurement used by the controller may be performed to reduce transients that may result from the two current measurements not being precisely equal at the switching time. The switching sequence continues as the reaction plate 14 moves up the stator 12 with the multiplexer 32 selecting alternately between the measurements of current flowing into the first representative stator sections 18.1 and the second representative stator sections 18.2.

An extension to the described basic switching strategy, for improved efficiency at the expense of complexity, is to supply the two outer stator sections that are only partially covered by the reaction plate 14 in addition to all the stator sections that are fully covered by the reaction plate. However, the voltage supplied to the outer stator sections must be modulated using the stator switches 20 to reduce the magnitude of the corresponding currents. This is because the inductance of a partially covered stator section is lower than that of a fully covered section and there is less induced back EMF. The control of the currents in the outer stator sections is achieved by switching (faster than the rated frequency of the motor) each of the two sections on and off, with a duty cycle that results in a similar magnitude of current as is flowing in the fully covered stator sections, by a modulator 50.

If sensorless control is to be achieved, there needs to be a way of finding the initial position of the reaction plate 14 to within a pole-pair. Thereafter, the "angular position estimate" from a suitable motor control algorithm running in the controller 30 can be used to keep track of the position of the reaction plate 14. Fortunately, a binary search can be used to find this initial position because the inductance of each section 18 is dependent on how much of it is covered by the reaction plate 14. The inductance of a portion of the winding can be effectively measured by timing the current decay after the relevant section of stator is briefly energised, by an inductance measuring module 44. The time-constant for the decay is directly proportional to the inductance (for a constant resistance). The first step to finding the position of the reaction plate 14 is to measure the inductance of all the alternate representative stator groups in one half of the length of travel of the reaction plate 14, followed by the inductance of all the alternate representative stator groups in the other half. The reaction plate 14 is then known to be in the half of the stator 12 with the higher inductance. The process is repeated in the half that contains the reaction plate 14 until its position is obtained to within a representative stator section. Once the position of the reaction plate 14 is known to within a representative stator section, the inductances of the stator sections above the particular representative section are measured, one-by-one, until the edge of the reaction plate 14 is found to within a stator section. Finally, the edge of the reaction plate 14 is found to within a pole pair, since the inductance of the stator section facing the edge is related to the number of poles covered by the reaction plate. The inductance of the stator section facing the other edge of the reaction plate can be used as a check. Clearly, the full search procedure is not necessary every time the controller is enabled because the controller can first check if the reaction plate has moved from its previous location by starting to search at this location.

The optimum length for the portion of the reaction plate 14 that interacts with the stator 12 is as shown in the drawing but the control strategy still applies for a reaction plate 14 that is up to a full stator section length shorter or longer than this.

The invention claimed is:

1. A linear motor which includes a fixed primary that is divided into a number of sections, the sections being categorized into three groups, being a first group of representative sections, a second group of representative sections and a third group of ordinary sections;
   a translating secondary that has an operative length that is longer than any two adjacent sections of the primary; and
   a connecting means for connecting only those sections of the primary that are covered by the secondary to a power supply;
   the connecting means including an independently operable switch for each section and a control means for controlling opening and closing of the switches;
   the control means having a position determining means for determining which of the sections are covered by the secondary; and
   the control means having a current measuring means for measuring the current in the first and second representative sections with the position determining means being responsive thereto, in which
   the first and second representative sections alternate with at least one ordinary section from the third croup between them; and
   the number of ordinary sections between a first representative section and the next second representative section is the same as that between that second representative section and the next first representative section.

2. A linear motor as claimed in claim 1, in which the primary comprises a stator.

3. A linear motor as claimed in claim 1, in which the secondary comprises a reaction plate.

4. A linear motor as claimed in claim 3, in which the primary sections all have the same length.

5. A linear motor as claimed in claim 3, in which the length of the reaction plate is equal to the distance from the beginning of a first representative section to the end of the ordinary section immediately following the next second representative section.

6. A linear motor as claimed in claim 1, in which the current measuring means includes a filtering means for filtering out transients in current measured thereby.

7. A linear motor as claimed in claim 1, which includes a temperature determining means for determining the temperature of at least one of the primary sections, the position determining means being responsive thereto.

8. A linear motor as claimed in claim 1, in which the control means includes a modulating means for modulating operation of the switches of those primary sections that are only partially covered by the secondary.

9. A linear motor as claimed in claim 1, in which the control means includes an inductance measuring means for measuring the inductance of a selected set of primary sections.

10. A method of controlling a linear motor having a fixed primary that is divided into a number of sections, the sections being categorized into three groups, being a first group of representative sections, a second group of representative sections and a third group of ordinary sections, and having a translating secondary that has an operative length that is longer than any two adjacent sections of the primary and with the first and second representative sections alternating with at least one ordinary section from the third group between them and with the number of ordinary sections between a first representative section and the next second representative section being the same as that between that second representative section and the next first representative section, which includes determining which of the primary sections are covered by the secondary; and energizing only those sections that are covered by the secondary;

the primary sections that are covered by the secondary being determined by measuring the current in the first and second representative sections.

11. A method of controlling a linear motor as claimed in claim 10, in which the primary comprises a stator.

12. A method of controlling a linear motor as claimed in claim 10, in which the secondary comprises a reaction plate.

13. A method of controlling a linear motor as claimed in claim 10, in which the primary sections all have the same length.

14. A method of controlling a linear motor as claimed in claim 10, in which the length of the secondary is equal to the distance from the beginning of a first representative section to the end of the ordinary section immediately following the next second representative section.

15. A method of controlling a linear motor as claimed in claim 10, which includes filtering out transients in the measured current.

16. A method of controlling a linear motor as claimed in claim 10, which includes determining the temperature of at least one of the primary sections.

17. A method of controlling a linear motor as claimed in claim 10, which includes modulating the supply of power to those primary sections that are only partially covered by the secondary.

18. A method of controlling a linear motor as claimed in claim 10, which includes measuring the inductance of a selected set of primary sections in order to determine the position of the secondary.

19. A control arrangement for a linear motor having a fixed primary that is divided into a number of sections, the sections being categorized into three groups, being a first group of representative sections, a second group of representative sections and a third group of ordinary sections, in which the first and second representative sections alternate with at least one ordinary section from the third group between them and in which the number of ordinary sections between a first representative section and the next second representative section being the same as that between that second representative section and the next first representative section, and having a translating secondary that has an operative length that is longer than any two adjacent sections of the primary, which includes a connecting means for connecting only those sections of the primary that are covered by the secondary to a power supply, the connecting means including an independently operable switch for each section and a control means for controlling opening and closing of the switches;

the control means having a position determining means for determining which of the sections are covered by the secondary and having a current measuring means for measuring the current in the first and second representative sections, the position determining means being responsive to the current measuring means.

20. A control arrangement as claimed in claim 19, in which the current measuring means includes a filtering means for filtering out transients in current measured thereby.

21. A control arrangement as claimed in claim 19, which includes a temperature determining means for determining the temperature of at least one of the sections, the position determining means being responsive thereto.

22. A control arrangement as claimed in claim 19, in which the control means includes a modulating means for modulating operation of the switches of those sections that are only partially covered by the secondary.

23. A control arrangement as claimed in claim 19, in which the control means includes an inductance measuring means for measuring the inductance of a selected set of sections.

24. A method of controlling a linear motor having a fixed primary that is divided into a number of sections, the sections being categorized into three groups, being a first group of representative sections, a second group of representative sections and a third group of ordinary sections, with the primary sections all having the same length, the first and second group of representative sections alternating with the same number of ordinary sections from the third group between them, and having a translating secondary that has an operative length equal to the distance from the beginning of a first representative section to the end of the ordinary section immediately following the next second representative section, which includes determining which of the primary sections are covered by the secondary; and energizing only those sections that are covered by the secondary; the primary sections that are covered by the secondary being determined by measuring the current in the first and second representative sections.

\* \* \* \* \*